No. 744,947. PATENTED NOV. 24, 1903.
G. R. WARD.
PAPER BAG MACHINE.
APPLICATION FILED AUG. 14, 1900.
NO MODEL. 13 SHEETS—SHEET 1.

Fig. 1.

WITNESSES: INVENTOR
Geo. R. Ward,
BY
ATTORNEY

No. 744,947. PATENTED NOV. 24, 1903.
G. R. WARD.
PAPER BAG MACHINE.
APPLICATION FILED AUG. 14, 1900.
NO MODEL. 13 SHEETS—SHEET 3.

WITNESSES: INVENTOR

Fig. 4.

No. 744,947. PATENTED NOV. 24, 1903.
G. R. WARD.
PAPER BAG MACHINE.
APPLICATION FILED AUG. 14, 1900.
NO MODEL. 13 SHEETS—SHEET 5.

Fig. 5.

WITNESSES:
INVENTOR
Geo. R. Ward,
BY
ATTORNEY

No. 744,947. PATENTED NOV. 24, 1903.
G. R. WARD.
PAPER BAG MACHINE.
APPLICATION FILED AUG. 14, 1900.
NO MODEL. 13 SHEETS—SHEET 8.

No. 744,947. PATENTED NOV. 24, 1903.
G. R. WARD.
PAPER BAG MACHINE.
APPLICATION FILED AUG. 14, 1900.
NO MODEL. 13 SHEETS—SHEET 9.

WITNESSES:
J. H. Goldsborough
J. E. Hutchinson Jr.

INVENTOR
Geo. R. Ward,
BY
ATTORNEY

No. 744,947. PATENTED NOV. 24, 1903.
G. R. WARD.
PAPER BAG MACHINE.
APPLICATION FILED AUG. 14, 1900.
NO MODEL. 13 SHEETS—SHEET 11.

WITNESSES: INVENTOR
J. H. Goldsborough Geo. R. Ward,
J. E. Hutchinson Jr. BY
John Kennie,
ATTORNEY.

No. 744,947. Patented November 24, 1903.

UNITED STATES PATENT OFFICE.

GEORGE R. WARD, OF NEW YORK, N. Y., ASSIGNOR, BY MESNE ASSIGNMENTS, TO THE UNION PAPER BAG MACHINE COMPANY, OF PHILADELPHIA, PENNSYLVANIA, A CORPORATION OF PENNSYLVANIA.

PAPER-BAG MACHINE.

SPECIFICATION forming part of Letters Patent No. 744,947, dated November 24, 1903.

Application filed August 14, 1900. Serial No. 26,819. (No model.)

*To all whom it may concern:*

Be it known that I, GEORGE R. WARD, a citizen of the United States of America, residing in the city, county, and State of New York, have invented certain new and useful Improvements in Paper-Bag Machines, of which the following is a true and exact description, reference being had to the accompanying drawings, which form a part thereof.

My invention relates to paper-bag machines adapted to form from bellows-folded blanks paper bags of the character generally known as "self-opening square bags," the object of my invention being to provide new and efficient mechanism for manufacturing such bags.

The leading features of my invention consist in providing a rotating carrier with one or more (preferably two) folding beds and grippers for engaging and holding the blanks upon the beds, preferably in such a way that their rear ends will lie upon the folding table or tables. The rotary movement given to the carrier and beds is intermittent and in position to coact with the bed in one position of rest. I provide distending and folding mechanism whereby the end of the blank is distended into what is called the "diamond" fold. In another succeeding position of rest I provide mechanism to coact with the folding-beds, by means of which the diamond fold has its flaps turned in upon the bottom of the bag and upon each other to complete the bag-bottom, paste being preferably applied to the diamond during the movement of the carrier from the first to the succeeding rest position.

The nature of my improvements and their mode of operation will be best understood as described in connection with the drawings, in which they are illustrated, and in which—

Figure 4:
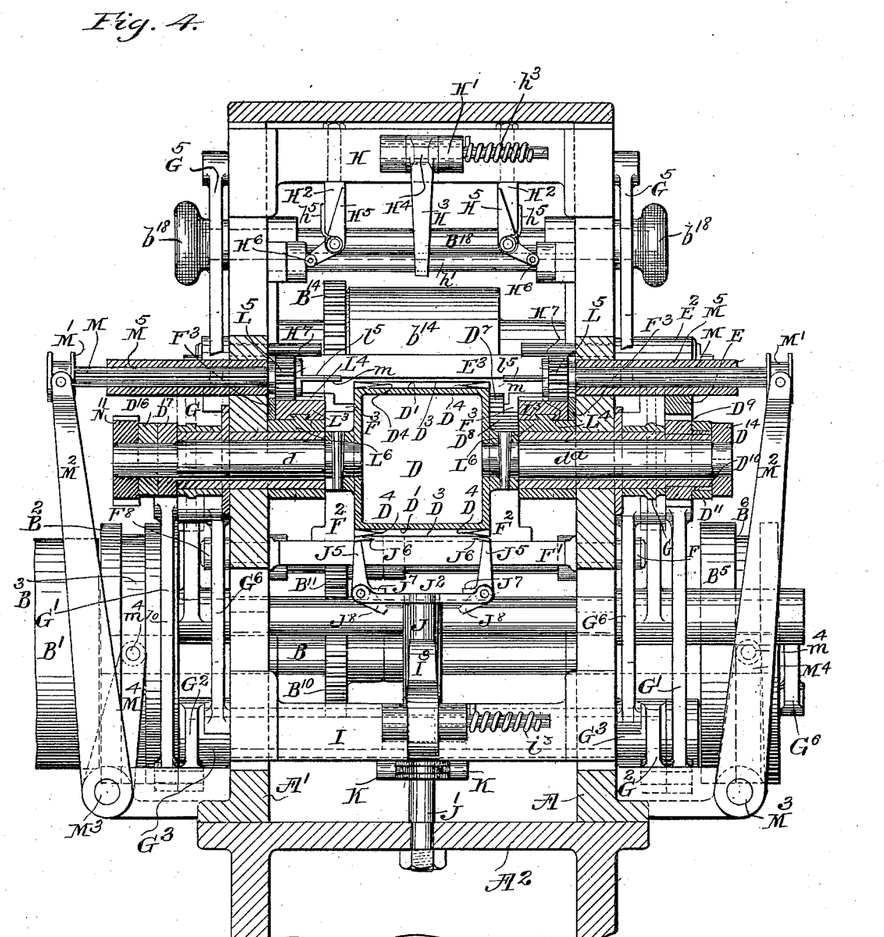
Fig. 4 is a vertical cross-section taken substantially on the section-line 4 4 of Fig. 1.
Figure 5:
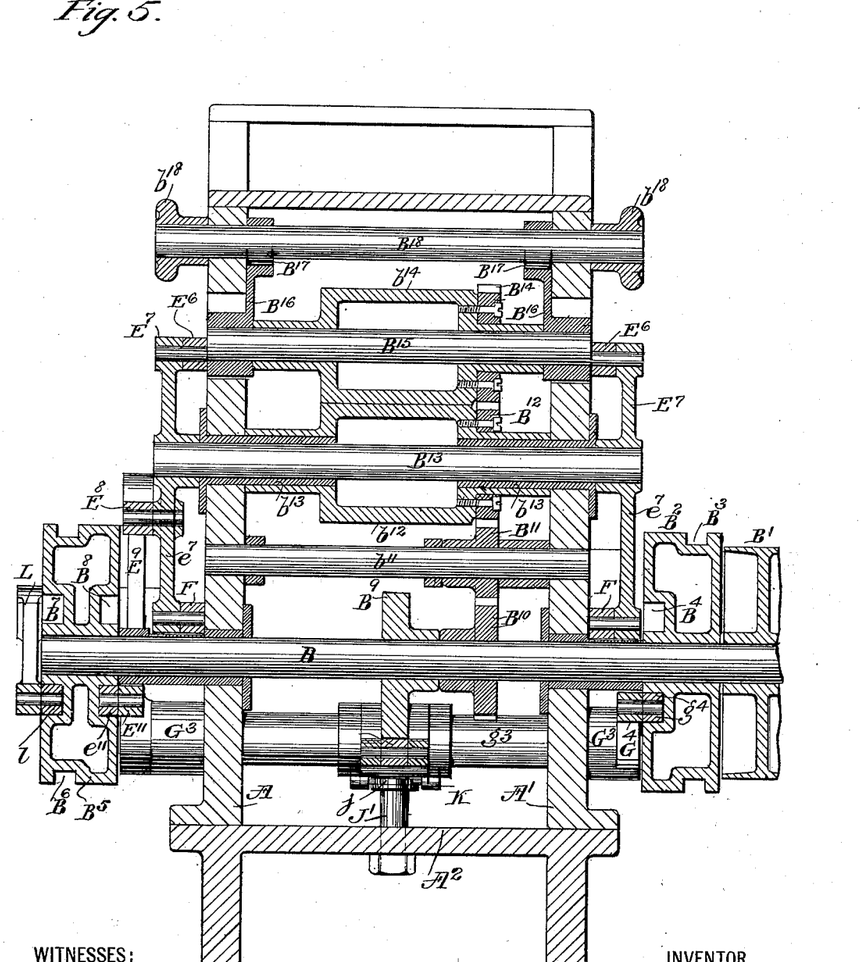
Fig. 5, a vertical cross-section taken substantially on the section-line 5 5 of Fig. 2.

A and A' are the side plates or frames of the machine, supported, as shown in Figs. 4 and 5, on a pedestal $A^2$.

B is the main driving-shaft of the machine, B' indicating a pulley-wheel secured thereto; $B^2$ and $B^5$, cam-drums, also secured on the shaft B, the cam-drum $B^2$ having a circumferential cam-groove $B^3$ and a lateral cam-groove $B^4$ on its inner face. The drum $B^5$ has the circumferential cam-groove $B^6$ and the cam-grooves $B^7$ and $B^8$ on its opposite faces.

Figure 2:
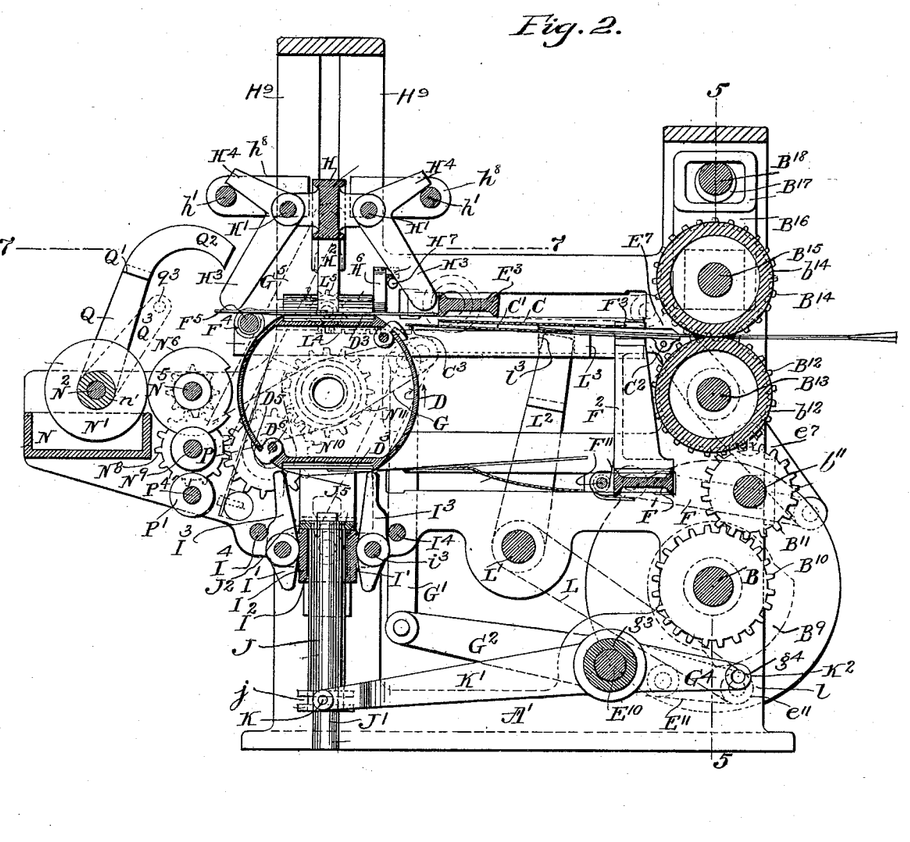
Fig. 2, a central longitudinal section through the machine, taken substantially on the line 2 2 of Fig. 3.

$B^9$ is a cam secured at or near the center of the shaft B, and $B^{10}$ is a gear-wheel, also secured to said shaft, the said gear-wheel driving an intermediate gear $B^{11}$, journaled on a shaft $b^{11}$ and driving by means of gear-wheels $B^{12}$ the lower feed-roll $b^{12}$, which is journaled, as shown in Fig. 5, on the sleeves in which is journaled the shaft $B^{13}$. The gear-wheel $B^{12}$ also drives the gear-wheel $B^{14}$, which is secured to and actuates the upper feed-roll $b^{14}$, journaled on the shaft $B^{15}$, this shaft being, as shown, supported on hangers $B^{16}$, which in turn are supported, as best shown in Fig. 2, by eccentrics $B^{17}$, secured to the transverse shaft $B^{18}$, which shaft has at its outer ends hand-wheels $b^{18}$, by which it can be turned and the pressure on the feed-rolls upon each other adjusted.

C indicates a directing box or guide through which the bag-blanks pass on their way from the feed-rolls to the carrier. It is made up, as shown, of upper and lower plates separated by side bars, (indicated at C',) is pivotally supported at its end near the feed-rolls, as shown at $C^2$, and rests at its front end on pins, (indicated at $C^3$.)

D is the carrier-drum, which, as shown, is provided with two folding-tables, being recessed on opposite sides, as indicated at D' D', the front and rear edges of the recesses having sharp edges, as indicated at $D^2$. In each of these recesses is the folding-table proper (indicated at $D^3$) and normally supported flush with the edges $D^2$ on springs $D^4$, (see Fig. 4,) which permit it to yield under pressure.

Figure 27:
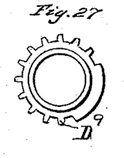
Figure 28:
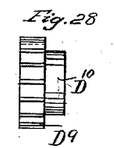
Figure 29:
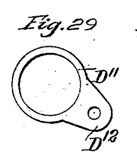
Figure 30:
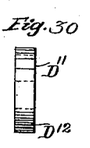
Figure 31:
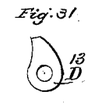
Figure 32:
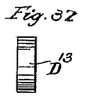
Figure 33:
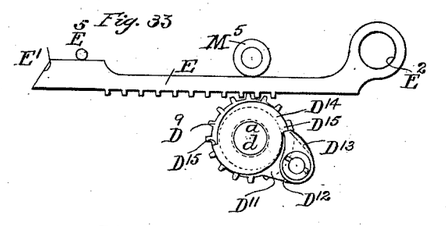
Figure 34:
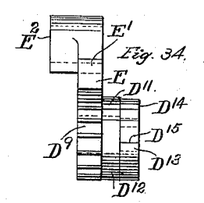
Figure 35:
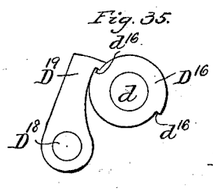
Figure 48:
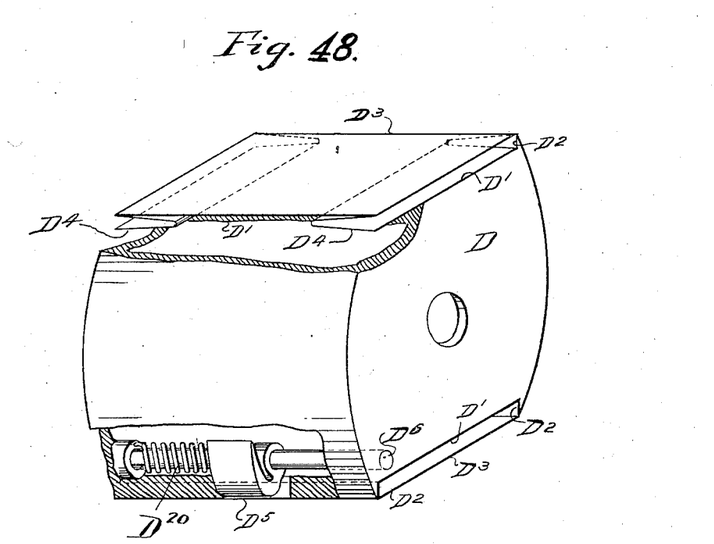
Fig. 48 is an enlarged perspective of the carrier, partly broken away to show the relation of the coöperating parts thereof.

$D^5$ $D^5$ indicate gripping-jaws extending through openings, which, as shown, lie immediately in front of each folding-table and are secured to the shafts $D^6$, journaled in the drum D and having secured to their outer ends at the side of the drum the fingers $D^7$, which as the carrier comes to rest alternately come in contact with the stationary finger $D^8$, raising the jaw to release the end of the completed bag, the renewed motion of the carrier afterward opening the jaw wider to receive a new blank. A spring $D^{20}$, as usual in these devices, normally holds the jaw down in position to clamp a blank to the drum. (See Figs. 7 and 48.) The drum D is secured to the shafts, (indicated at $d$ and $d^a$, Fig. 4,) said shafts extending through sleeves secured in the side frames of the machine and the shaft $d^a$ having journaled upon a sleeve extending around its outer end the segmental gear-wheel $D^9$, (see Figs. 27 and 28,) having a sleeve extension $D^{10}$, to which is firmly secured the sleeve $D^{11}$, having extending from it the pawl-carrying arm $D^{12}$, (see Figs. 1, 28, and 29,) $D^{13}$ indicating the pawl pivoted on the arm $D^{12}$ and arranged to engage when moving in one direction with one of the detents $D^{15}$ $D^{15}$, formed on the edge of a plate $D^{14}$, which is firmly secured to the end of the shaft $d^a$. It will be observed (see Figs. 33 and 34) that motion of the segmental gear $D^9$ in one direction will rotate the shaft $d^a$ and the drum and in the other direction will not affect these parts.

Figure 1:
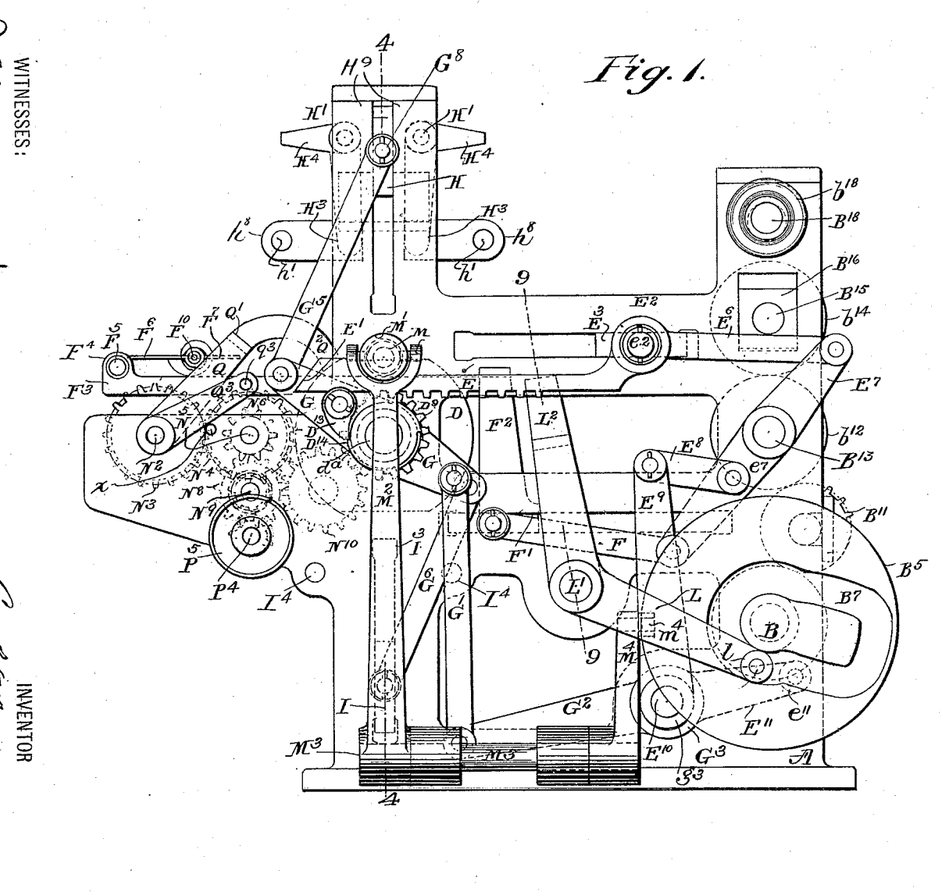
Figure 1 is a side elevation of my machine.

E is a reciprocating rack engaged and resting on the segmental gear $D^9$ and held in position as shown by the sleeve $m^5$. The outer end of the rack-bar is enlarged and beveled, as indicated at E', and the inner end, as indicated at $E^2$, is adapted to engage with a journal-pin $e^2$ (see Fig. 1) on the end of a horizontally-movable slide-bar $E^3$. Said bar $E^3$ is supported in slides in the side frames of the machine and is connected by links $E^6$ with the levers $E^7$, secured on the ends of the shaft $B^{13}$, (see Fig. 5,) said lever, which has oppositely-extending lever-arms $e^7$—one of which is connected, as shown in Figs. 1 and 5, through a link $E^8$ with an arm $E^9$—extending out from a sleeve journaled on a shaft $E^{10}$ and having also extending from it the lever-arm $E^{11}$ with a cam-roller $e^{11}$, which lies in and is operated by the cam-groove $B^8$ in the cam-drum $B^5$. It will thus be seen that the rotation of the cam effects a reciprocatory movement of the rack E, which in each outward stroke rotates the carrier-drum through an arc of one hundred and eighty degrees and in each return movement leaves the carrier-drum stationary. The two arms $e^7$ of the levers $E^7$ $E^7$ are connected through links F with a second transverse sliding bar indicated at F'. (See Figs. 1 and 2.)

$F^2$ $F^2$ indicate vertical standards extending up from the slide F' and supporting at their tops the longitudinally-extending bars $F^3$ $F^3$, which, as shown, move over and are supported on the bracket $L^6$ and lie between the side frames A A' and the racks, (indicated at $L^4$ $L^4$.) The ends of the sliding bars $F^3$ near the rear of the machine support the bearings (indicated at $F^4$ $F^4$) in which is supported the transverse shaft $F^5$, which, as shown in Fig. 7, has a pin $f^5$, projecting upward through a slot $f^4$ in one of the bearings $F^4$, the shaft $F^5$ being free to oscillate in its bearings to the extent permitted by the length of the slot $f^4$. Secured on the shaft $F^5$ is the sleeve $F^6$, from which project the arms $f^6$ $f^6$, having pivoted to their ends the arms $f^7$ $f^7$ of a transverse plate $F^7$, $F^8$ indicating a transverse wire extending across through the center of the pivots connecting the arms $f^7$ with the arms $f^6$, and $F^9$ indicating a spring fastened to the pivot of one of the arms $f^7$ and to the pivotally-connected arm $f^6$, said spring acting to press the plate $F^7$ downward against a rest-pin $f^9$, projecting from one of said arms $f^6$, (see Fig. 7,) which pin normally holds the plate $F^7$ in the position indicated in Fig. 6.

It will be seen from the corelation of the described parts that the sliding bars $F^3$ and the parts carried by them move back and forward reciprocally with relation to the movements of the rack E—that is, as rack E is advanced through its connection with rack-levers $E^7$ the sliding bars $F^3$ are correspondingly retracted, due to their connection with the opposite ends of levers $E^7$.

$F^{11}$ is a shaft journaled in the forward projections of the slide $F'$, and to which is attached the discharge-plate $F^{12}$, $F^{14}$ indicating an upwardly-extending shoulder which acts as a stop by coming in contact with the upright standards $F^2$, and $F^{15}$ indicating a spring which normally throws the plate $F^{12}$ upward until the stop is in contact with the standards.

Figure 36:
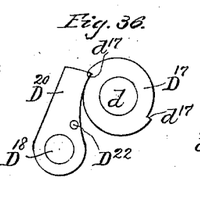
Figure 37:
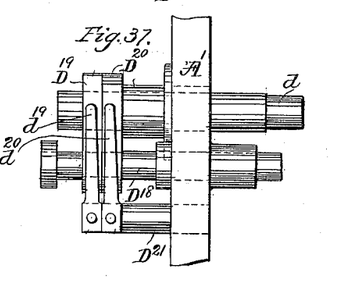
Figure 38:
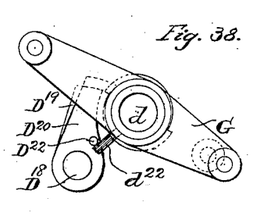
Figure 39:
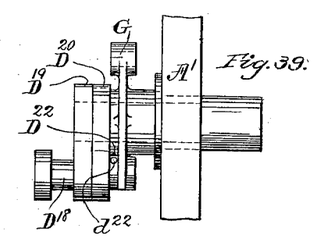

Returning now to the shaft $d$, (see Fig. 4,) connected with the carrier-drum D on the opposite side to the shaft $d^a$, $D^{16}$ $D^{17}$ are stop-disks secured to the shaft $d$ and each having oppositely-disposed stop-fingers, as indicated at $d^{16}$ $d^{16}$ and $d^{17}$ $d^{17}$, (see for details Figs. 35 to 39,) and it will be observed that the stops on the disks are arranged in opposite directions. Pivoted on the end of a shaft $D^{18}$, mounted in frame $A'$, are the two locking-dogs $D^{19}$ and $D^{20}$, the dog $D^{19}$ being arranged to engage with the detents on the disk $D^{16}$ and the dog $D^{20}$ to engage with the detents on the disk $D^{17}$. Spring-fingers $d^{19}$ and $d^{20}$, fastened to a stud $D^{21}$, projecting from frame $A'$, hold the dogs in contact with the locking-disks, and when both are engaged, as they are in each position of rest of the carrier-drum, the said drum is securely locked against movement in either direction. Projecting from the dog $D^{20}$ is a pin $D^{22}$, (see Figs. 36, 38, and 39,) which is arranged in the path of a pin $d^{22}$, projecting out from the rocker G, and which when the rocker G is oscillated forward comes in contact with and lifts the dog $D^{20}$ and the pin $D^{22}$, as shown in Fig. 38, permitting the revolution of the carrier.

G G are rock-levers having oppositely-extending arms and pivoted on the sleeves through which the shafts $d$ and $d^a$ pass. One arm of each of these levers is connected by links $G'$ with levers $G^2$ $G^2$, firmly attached, by means of hubs $G^3$, to the hollow shaft $g^3$, supported on the shaft $E^{10}$, said hollow shaft being given an oscillatory movement by means of the lever $G^4$, extending out from it and connecting, through the cam-roller $g^4$, with the cam-groove $B^4$ in the cam-drum $B^2$. One arm of each of the swinging levers G is connected by a link $G^5$ with a pin $G^8$ at each end of the upper slide H, which moves in vertical guideways $H^9$ $H^9$ in the frame of the machine immediately above the upper table when in position of rest. On lateral projections of the slide H (see Fig. 2) are supported pivoted pins $H'$, on which are pivoted fingers $H^3$ $H^3$, having upwardly-extending arms (indicated at $H^4$ $H^4$) of such length that they are engaged by pins $h'$ $h'$, carried by lateral brackets $h^3$ $h^3$ on the guideways $H^9$ $H^9$, during the downward movement of the slide H, causing the fingers $H^3$ to be thrust out as they move downward in the manner indicated in Fig. 2. Extending from the bottom of the slide H are the projecting arms $H^2$ $H^2$, (see Figs. 2, 4, 19, and 20,) said arms having pivoted on pins passing through their ends fingers $H^5$, held normally in the position indicated in Fig. 4 by the springs $h^5$, but having outwardly-projecting arms, as indicated at $H^6$, which as the slide descends come in contact with pins $H^7$, forcing the fingers $H^5$ inward, as best shown in Fig. 19.

To the arms of the levers G opposite those to which links $G^5$ are connected is connected, by means of links $G^6$, the vertical slide I. (See Figs. 2, 4, 8, 10, 19, and 20.) This slide is made with a central vertical perforation $I^2$ and with lateral projections $I'$, on which are pivoted the fingers $I^3$ $I^3$, normally held in upwardly and outwardly inclined position by springs $i^3$, attached at one end to the pivots of fingers $I^3$ $I^3$ and bearing against the face of slide I at the other end. (See Figs. 10 and 19.)

Figures 19, 20:
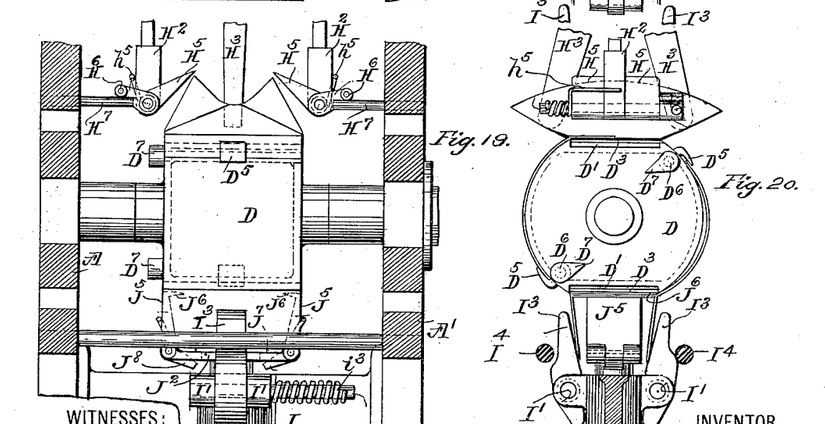
Fig. 19 is a view from the same point of view as Figs. 15 and 17, showing the operation of the devices which stretch out and flatten the end of the bag into the diamond fold.
Fig. 20 is an end view showing the parts in the same position as Fig. 19 and exhibiting also the action of the devices operating to fold in the flaps of the diamond in order to complete the bag.
Figure 21:
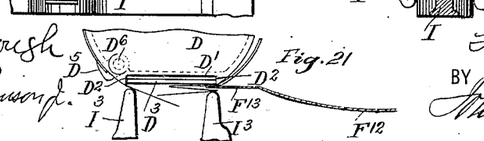
Fig. 21 is a view showing the further action of these parts in completing the bag.
Figure 22:
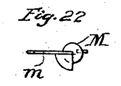
Figs. 22 to 39, inclusive, are detached views of various details of the mechanism.
Figure 23:
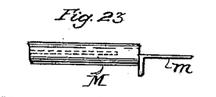

$I^4$ $I^4$ are fixed pins secured to the side frames A $A'$, against which the fingers $I^3$ press as the slide I moves upward, said pins pressing first one and then the other of the fingers $I^3$ inward, as indicated in Figs. 2, 20, and 21.

Figures 8, 11, 12, 13, 14:
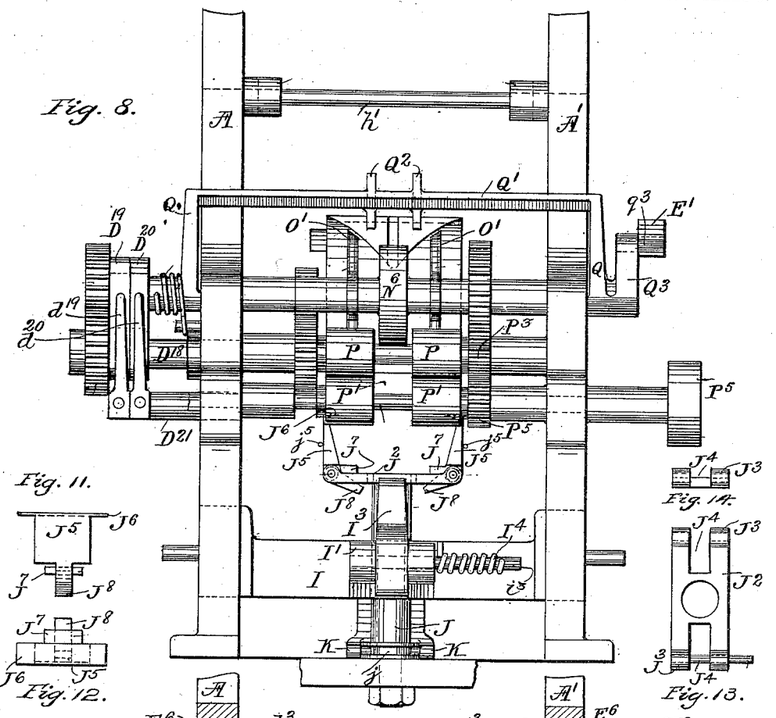
Fig. 8 is a front view of the machine with the paste-trough shown in Figs. 1, 2, and 3 and other parts removed.
Fig. 11 is a side view of one of the arms $J^5$ attached to the bottom slide.
Fig. 12 is a top view of the same arm.
Fig. 13 is a plan view of the slide to which the jaws $J^5$ are pivoted.
Fig. 14, an end view of this slide.
Figures 9, 10:
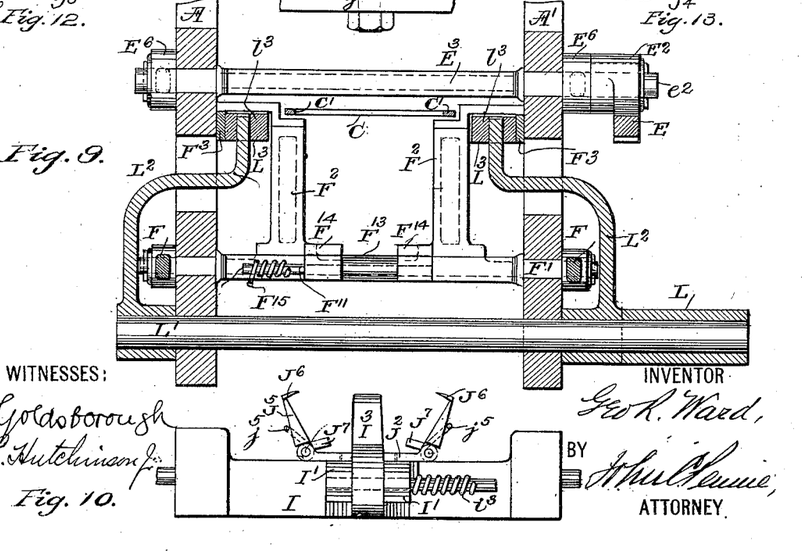
Fig. 9 is a cross-sectional view taken substantially on the section-line 9 9 of Fig. 1.
Fig. 10 is a front elevation of the lower slide I and its attachments.
Figure 41:
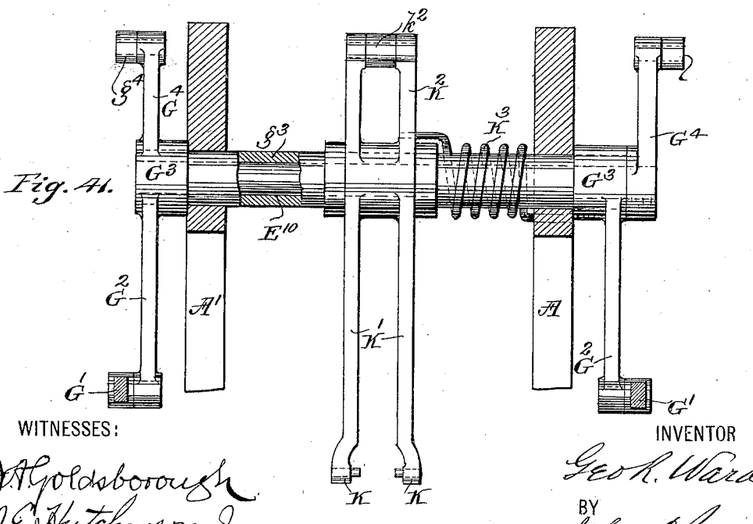
Fig. 41 is a view, partly in section, showing the shaft $E^{10}$ and parts connected therewith.

J is a tubular sleeve supported on a fixed pin $J'$ and passing through the opening $I^2$ in the slide I. The lower part of the sleeve J is provided with a grooved collar $j$, while at the top of the sleeve is fastened the plate $J^2$. (Best shown in Figs. 8, 10, 13, and 14.) The outer ends of the plate $J^2$ are provided with bearings, as indicated at $J^3$, to receive a pivot-pin and are slotted, as indicated at $J^4$, and in these slots and pivoted to the pins are the arms $J^5$, supporting at their top blades $J^6$. (See Figs. 8, 10, 11, and 12.) The arms $J^5$ have projecting from them stop-plates, (indicated at $J^7$,) which when the arms are in upright position rest against the plate $J^2$. They have also projecting arms $J^8$, which extend down through the slots $J^4$ normally at an angle, as indicated in Fig. 8. Springs $j^5$, reacting between arms $J^5$ and their pivot-pins, (see Figs. 8 and 10,) normally hold the arms $J^5$ in the position indicated in Fig. 8; but when the slide I moves upward it comes in contact with the angular arms $J^8$, pressing them upward through the slots $J^4$ and bringing the arms $J^5$ to the position indicated in Fig. 10. Motion is imparted to the sleeve J and the parts carried by it through the collar $j$ by the yoke K at the end of the lever $K'$, which lever is journaled on the hollow shaft $g^3$ and has a rearward extension $K^2$, carrying a cam-roller $k^2$, which is acted on by the cam $B^9$, a spring $K^3$, Fig. 41, holding the cam-roller in contact with the cam.

Figure 24:
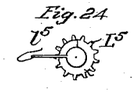
Figure 25:
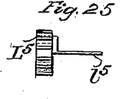
Figure 26:
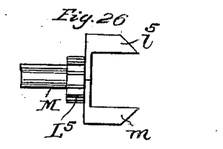

L is a lever-arm fastened to the shaft $L'$ and actuated through a cam-roll $l$ by the cam-groove $B^7$ in the cam-drum $B^5$. Connected to and moving with the shaft $L'$ are the upwardly and inwardly extending arms $L^2 L^2$, (see Fig. 9,) the upper ends of which extend into slots $l^3$ in longitudinally-extending bars $L^3$, which are supported on brackets $L^6$, supported in turn on the sleeves surrounding the shafts $d$ and $d^a$, the side bars $L^3$ having formed upon or attached to them racks $L^4$ and $L^4$, said racks being in engagement with the gear-wheels $L^5 L^5$, from which project the distending-fingers $l^5 l^5$. (See for details Figs. 24, 25, and 26.) The gear-wheels $L^5 L^5$ are journaled on the ends of longitudinally-movable shafts M M, having projecting from their ends distending-fingers $m\ m$. The shafts M move in sleeves $M^5$, (see Fig. 4,) to which they are keyed to prevent rotary movement, and have at their outer ends the sleeve-collars $M' M'$, engaged by yokes at the upper ends of the arms $M^2 M^2$, which arms are pivoted on shafts $M^3 M^3$, as indicated, (see Figs. 1 and 4,) the shafts having lever-arms $M^4$ attached to them, which by means of cam-rolls $m^4$ are actuated by the cam-grooves $B^3$ and $B^6$ in the cam-drums $B^2$ and $B^5$.

Figure 3:
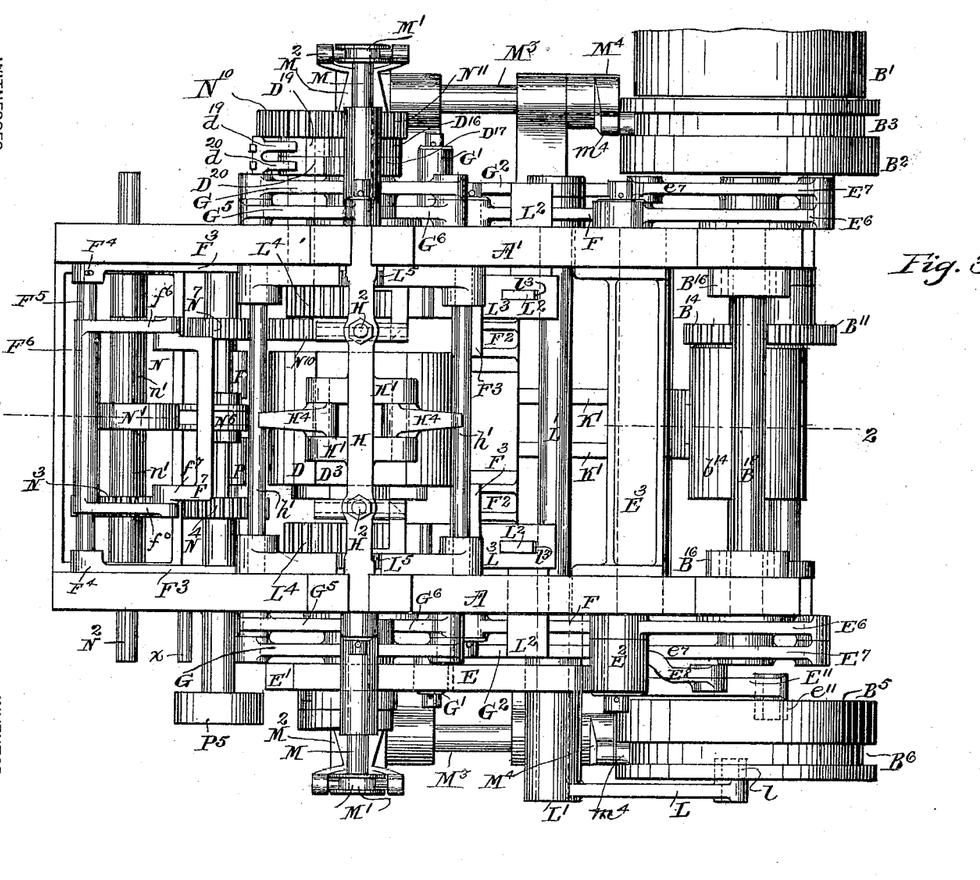
Fig. 3 is a plan view of the machine.

N indicates a paste-trough situated at the front end of the machine, $N'$ being a paste-roller having extended hubs $n'$, forming a sleeve, which is journaled on the shaft $N^2$. Attached to the hub-sleeves $n'$ is the gear-wheel $N^3$, which engages the gear-wheel $N^4$, fastened to the shaft $N^5$, to which in turn is fastened the pasting-disk $N^6$, as shown in Fig. 7. Also fastened on the shaft $N^5$ is the gear-wheel $N^7$, meshing with the gear-wheel $N^8$, which is loosely mounted on the shaft $N^9$ and meshes also with the gear-wheel $N^{10}$ and fastened to a shaft extending through the frame $A'$ and having at its outer end the gear-wheel $N^{10}$, (see Fig. 3,) which in its turn meshes with a gear-wheel $N^{11}$, fastened on the end of the shaft $d$, supporting one end of the carrier D, the relationship of the gearing being such that for each half-revolution of the carrier the pasting-disk makes a complete revolution, and with it the paste-roll also makes a complete revolution.

Figure 6:
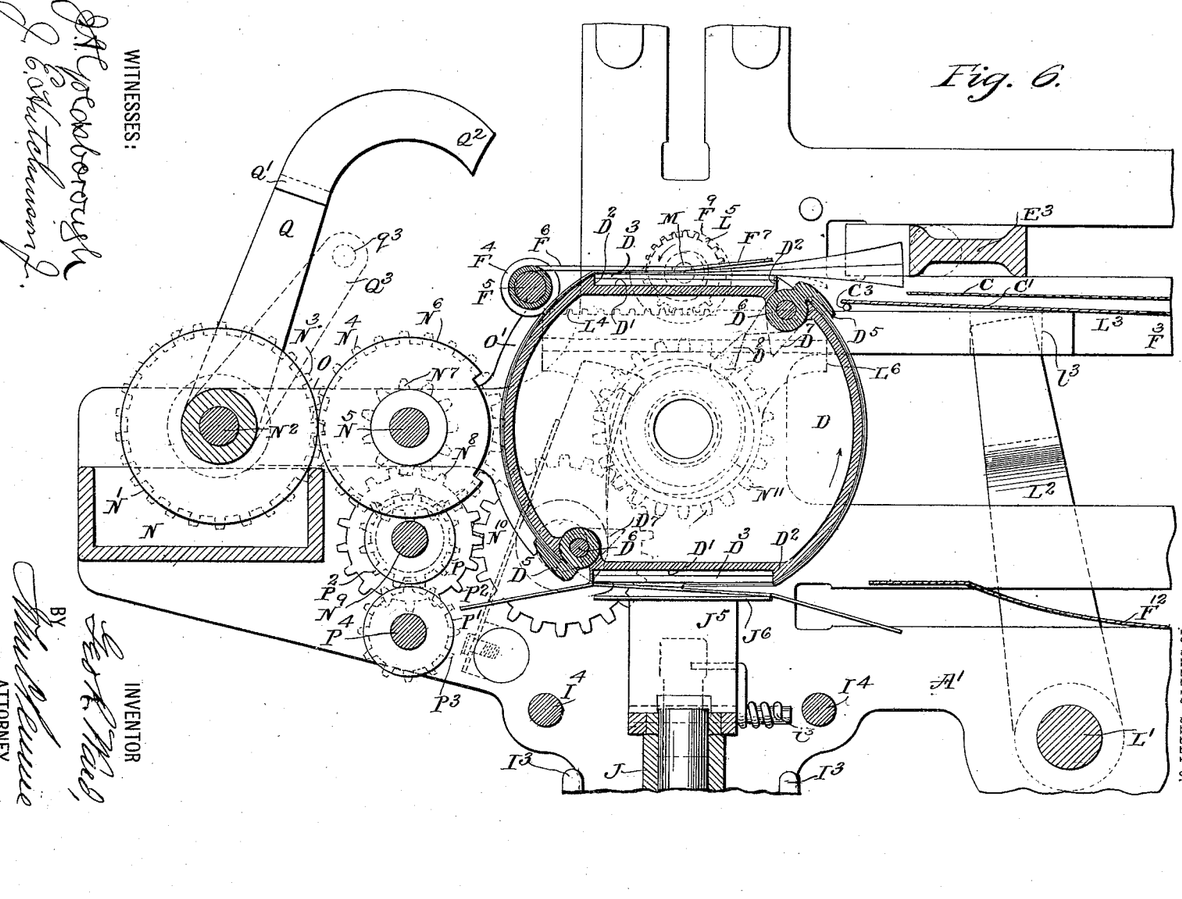
Fig. 6 is an enlarged view of a portion of the machine, shown substantially on the same section-line as Fig. 2.
Figure 7:
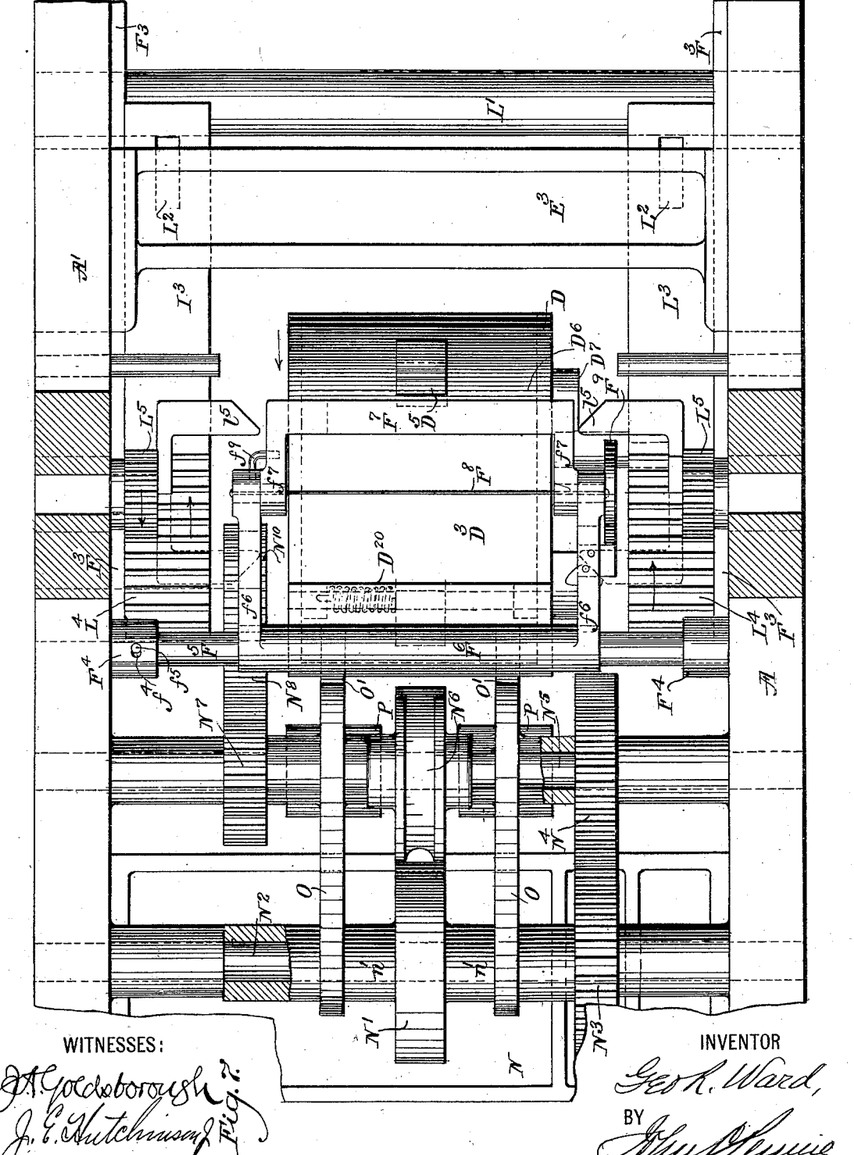
Fig. 7 is an enlarged plan view of a portion of the machine, taken substantially on the section-line 7 7 of Fig. 2.
Figures 15, 16, 17, 18:
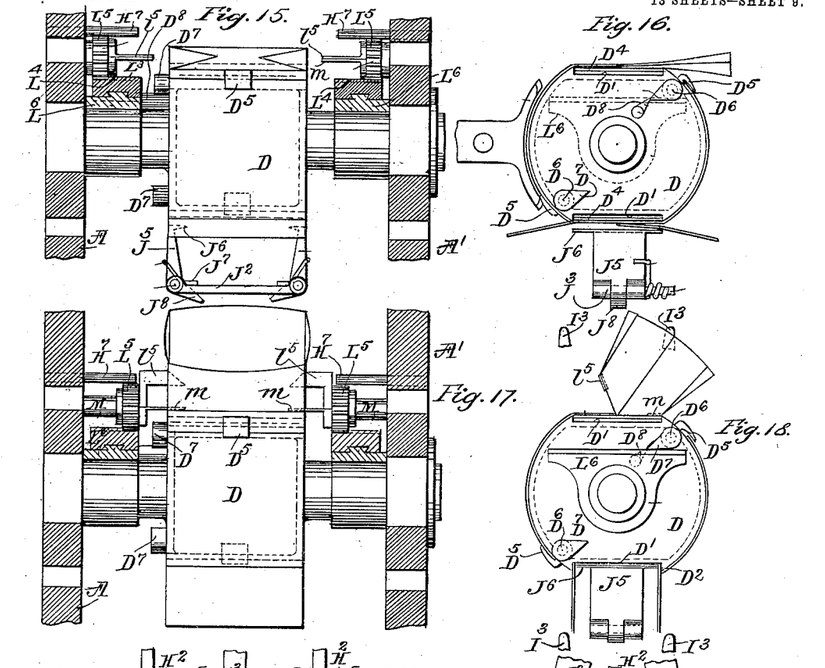
Fig. 15 is a sectional view taken slightly in the rear of the carrier-drum D, showing the position of parts about to operate on the blank at the time the carrier comes to rest.
Fig. 16 is an end view of the cylinder as shown in Fig. 15.
Fig. 17 is a view from the same point of view as Fig. 15, showing the operation of the distending-fingers on the end of the blank.
Fig. 18 is an end view of the parts in the position shown in Fig. 17.

O O (see Fig. 7) are frames loosely supported on the hubs $n'$ and on the shaft $N^5$, said frames supporting on their inner ends the arc-shaped guide-bars $O' O'$, which lie close to the face of the carrier, as shown in Figs. 6, 7, and 16.

P and $P'$ are the delivery-rolls of the machine, the upper roll P, with the gear-wheel $P^2$ connected with it, being journaled on the shaft $N^9$ and the lower roll $P'$, with its gear-wheel $P^3$, being fastened to the shaft $P^4$, to the outer end of which is fastened a pulley-wheel $P^5$, by means of which the delivery-rolls are actuated. (See Figs. 2 and 6.)

Q Q are arms fastened to the shaft $N^2$, supporting at their ends a cross-bar $Q'$, (see Fig. 8,) from which extend the guiding-fingers $Q^2 Q^2$. Also fastened to the shaft $N^2$ is the lever-arm $Q^3$, carrying the cam-roll $q^3$, which lies directly in the path of the beveled end $E'$ of the reciprocating rack E, said beveled end when thrust outward raising the arms Q and connected parts, as shown, for instance, in Fig. 6, while when retracted the arms are permitted to fall to the position indicated in Fig. 1, in which arm $Q^3$ rests on pin X in frame A.

Figure 40:
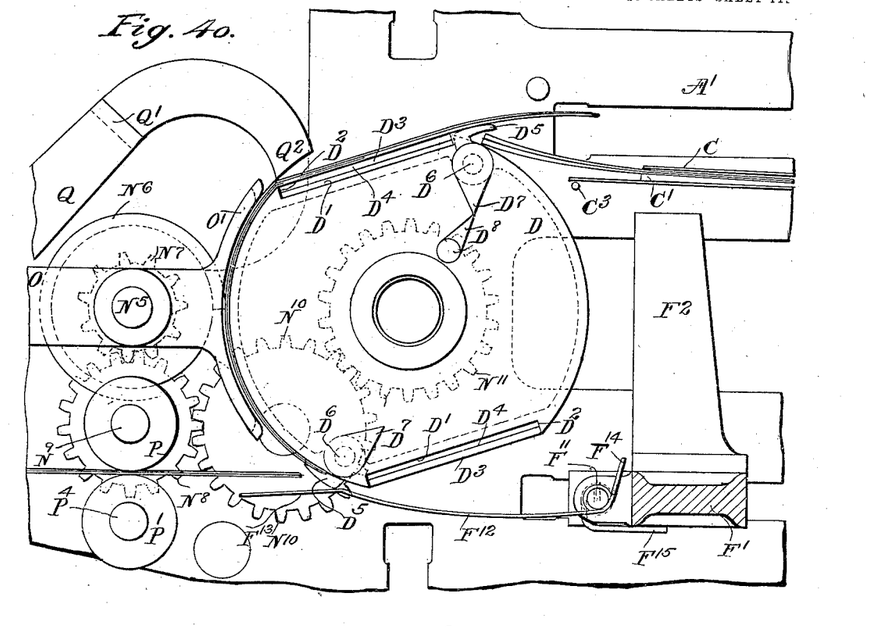
Fig. 40 is a side elevation on a large scale, showing the devices for holding the diamond fold in position and applying paste to it during the movement of the carrier from its first to its succeeding position of rest.
Figures 42, 43, 44, 45, 46, 47:
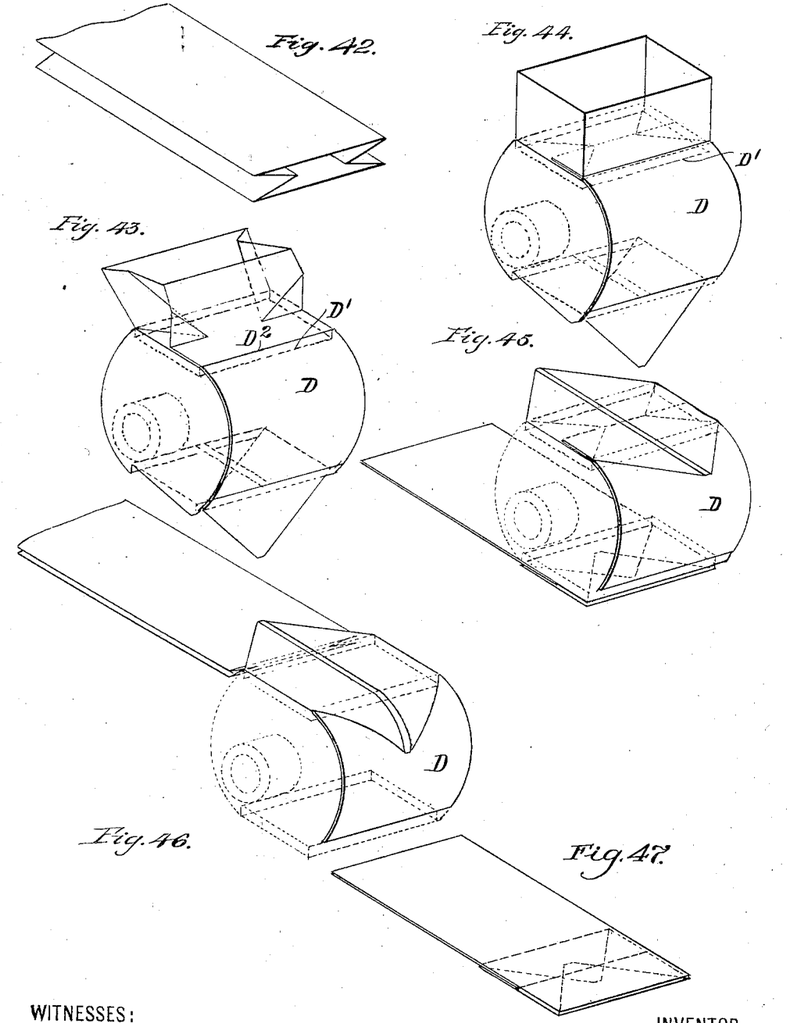
Fig. 42 is a perspective view of a tucked tubular blank such as my machine operates upon.
Figs. 43, 44, 45, and 46 are views showing the successive actions performed upon the blank.
Fig. 47, a view of the complete bag as it leaves the machine.

In operation the bag-blanks are fed into the machine through the feed-rolls $b^{14}\ b^{12}$ and between the plates of guide C, the front end of the tubular blank being fed beneath a gripper $D^5$ at the time that it is opened by the finger $D^8$, as shown, for instance, in Fig. 40. The gripper then immediately closes down on the end of the blank, and the carrier being at this time in rotation the blank is carried along by it, folding over the cylindrical surface in the rear of the gripper until its other end lies upon the table lying opposite to the engaged gripper substantially in the position indicated in Figs. 6 and 16. During the rotation of the carrier to the position shown in these figures the sliding bars $F^3$ are moved backward, carrying with them the shaft $F^5$, the wire $F^8$, supported thereon through the arms $f^6$, and the transverse plate $F^7$, which when the carrier comes to rest lie upon the table $D^3$ over the blank in the positions indicated in Figs. 6 and 7, the wire $F^8$ lying across the blank on the line in which it is to be spread open in the formation of the diamond fold, the blank being at rest and the distending-fingers $l^5$ and $m$ lying closed together, as indicated in Fig. 15. The shafts M M, carrying these closed fingers, are thrust inward by the action of the levers $M^2$, forcing the distending-fingers into the slightly-gaping tucks at the rear end of the blank, then the racks $L^4 L^4$ are moved toward the feed-rolls, causing the gear-wheels $L^5$ to rotate on the shafts M in the opposite direction to that in which the hands of a watch move and spreading open the rear end of the blank into a box-like form, as indicated in Figs. 17 and 18. The box having been formed, the slide H then moves downward until the depending fingers $H^3$ lie within the box, and then, continuing to move downward, these fingers are rotated outwardly by their arms $H^4$ coming in contact with the cross-bars $h'$, the fingers spreading out the box into an approximately diamond form, as indicated in Figs. 19 and 20, and while this spreading action is taking place the formation of the diamond is further facilitated by the inward motion of the fingers $H^5 H^5$, due to their arms $H^6$ coming in contact with the pins $H^7$. The action of these fingers is also illustrated in Figs. 19 and 20. It will be understood that the fingers $l^5$ in their rotary movement which distends the blank clamp the corners of the blank against the transverse plate F⁷, which moves over with the fingers until it lies beneath the forward end of the diamond fold. The diamond fold being completed by the mechanism described, the sliding plates F⁸ are moved backward, so as to enable the wire F⁸ and plate F⁷ to get out from beneath the diamond fold and permit it to pass forward with the next movement of the carrier. The slide H, with the parts depending on it, are moved upward, and as the rack-bar E moves backward preparatory to giving a further impulse to the carrier its bevel end E' permits the lever $Q^3$ and the attached arms Q Q, with the cross-bar Q' and pressure-fingers $Q^2$, to move down so that the said fingers rest upon the front end of the diamond fold, holding it in place on the carrier and serving to guide it beneath the stationary guide-plates O' O'. The fingers $Q^2$ remain in contact with the carrier until in the operative stroke of the rack E its end comes in contact with the roller on the lever-arm $Q^3$, when it is raised to the position shown in Fig. 6. As the diamond passes beneath the guides O' paste is applied to it by the paste-roll $N^6$, so that when the table upon which the diamond has been formed comes to the next position of rest immediately above the slide I it is fully pasted and ready to be formed into a bag-bottom. Having arrived at this second rest position, the plate $J^2$, carrying the arms $J^5$ with the blades $J^6$ at their ends, are moved up by the mechanism described until the blades press against the central part of the diamond fold, the ends of the blades corresponding in position with the folds upon which the diamond is to be folded in completing the bag-bottom. The upward movement of the plate $J^2$ is continued far enough to press the elastically-supported table $D^3$ inward into the recess D', so that the end flaps of the diamond are pressed down by the edges $D^2$ $D^2$ of the recess D' and between these edges and the ends of the plates $J^6$, so that the said under flaps of the diamond assume the position indicated in Fig. 20. (See in Figs. 43 and 44.) While the parts are in this position the slide I is moved up, carrying with it the two fingers $I^3$, which pass to the outside of the downwardly-turned flaps of the diamond fold, as shown in Fig. 20, and which as they continue their upward movement are swung inward by the action of the stationary rods $I^4$ $I^4$, so as to fold the flaps of the diamond one after the other down upon the center and the one upon the other, as indicated in Figs. 2 and 21, and as this folding movement is completed—that is, during the last part of the upward movement of the slide I—the said slide coming in contact with the fingers $J^8$, extending from the arms $J^5$, press these fingers up and press the arms and blades $J^6$ outward, so as to remove the said blades from contact with the diamond fold, this action being illustrated in Fig. 10 of the drawings. After these folding actions are completed the plate $J^2$ and the slide I are first slightly retracted, so as to offer no opposition to the turning movement of the carrier and so as to permit the rear portion of the bottom to gap slightly away from the body of the blank against which it is folded. At this time the delivering-plate $F^{12}$ is moved forward into this slightly-gaping space, so that the continued forward movement of the delivery-plate $F^{12}$ carries the blank forward and thrusts the front fold of the bottom between the delivery-rolls P P', which not only withdraw the completed bag from the machine, but compact and make permanent the pasted seam by which the bottom folds are held together.

Having now described my invention, what I claim as new, and desire to secure by Letters Patent, is—

1. In a paper-bag machine, an intermittently-rotating table-supporting carrier-cylinder for opening out the bottom of the bag and means for holding the blanks to the carrier in combination with means independent and not attached to the carrier operating to spread the end of the bag-blank into a diamond fold during one rest of the table and means situated on the opposite side of the cylinder for folding the diamond into a bag-bottom, said means acting at and during the same rest period as the first and operating on the table during a succeeding rest period.

2. In a paper-bag machine, an intermittently-rotating table-supporting carrier-cylinder for opening out the bottom of the bag and means for holding the blanks to the carrier, in combination with means independent and not attached to the carrier operating to spread the end of the bag-blank into a diamond fold during one rest of the table, means for applying paste to the diamond as the table moves from its position of rest in which the diamond is formed and means situated on the opposite side of the cylinder for folding the pasted diamond into a bag-bottom, said means acting at and during the same rest period as the first and operating on the table during a succeeding rest period.

3. In a paper-bag machine, an intermittently-rotating table-supporting carrier-cylinder for opening out the bottom of the bag and means for holding the front end of blanks to the carrier so that the rear ends will rest on the table in combination with means independent and not attached to the carrier operating to spread the rear end of the bag-blank into a diamond fold during one rest of the table and means for folding the diamond into a bag-bottom acting at and during another rest period and position of the table.

4. In a paper-bag machine, the combination with an intermittently-rotating carrier and one or more tables moving therewith, of a folding edge, as $F^8$, and hinged clamp, as $F^7$, supported independently of the carrier and means for reciprocating the same into positions to engage a blank before folding and disengage it after folding, and folding-blades also independent of the carrier adapted to enter the tucks of the blank and spread its bottom into a box form over the straight edge $F^8$, means for inserting and withdrawing said blades while the carrier is at rest and for rotating one of said blades while inserted in the blank.

5. In a paper-bag machine, the combination with an intermittently-rotating carrier and one or more tables moving therewith, of a folding edge, as $F^8$, and hinged clamp, as $F^7$, supported independently of the carrier and means for reciprocating the same into position to engage a blank before folding and disengage it after folding, folding-blades also independent of the carrier adapted to enter the tucks of the blank and spread its bottom into a box form over the straight edge $F^8$, means for inserting and withdrawing said blades while the carrier is at rest and for rotating one of said blades while inserted in the blank, distending-fingers, as $H^3 H^3$, adapted to enter and spread the box into a diamond and means for moving said fingers down and outward to spread the diamond and up to clear the blank while the carrier remains at rest.

6. In a paper-bag machine, the combination with an intermittently-rotating carrier and one or more tables moving therewith, of a folding edge, as $F^8$, and hinged clamp, as $F^7$, supported independently of the carrier and means for reciprocating the same into position to engage a blank before folding and disengage it after folding, folding-blades also independent of the carrier adapted to enter the tucks of the blank and spread its bottom into a box form over the straight edge $F^8$, means for inserting and withdrawing said blades while the carrier is at rest and for rotating one of said blades while inserted in the blank, distending-fingers, as $H^3 H^3$, adapted to enter and spread the box into a diamond, means for moving said fingers down and outward to spread the diamond and up to clear the blank while the carrier remains at rest, and flattening-fingers $H^5 H^5$ moving up and down with the fingers $H^3$ and acting to press in the sides of the diamond fold.

7. In a paper-bag machine, the combination with an intermittently-rotating carrier and means for distending the bottom of the blank into a box form, of a reciprocating slide as H, distending-fingers $H^3 H^3$, pivoted on said slide, flattening-fingers $H^5 H^5$ also pivoted on the slide and pins, as $h' h'$ and $H^7 H^7$, arranged to throw said fingers into operation on the blank as the slide moves down.

8. In a paper-bag machine the combination with an intermittently-rotating carrier and means for distending the bottom of the blank into a diamond fold in one position of rest and for folding the diamond into a bag-bottom in another position of rest, of an oscillating presser $Q^2$ operated to rest on the front end of the diamond and hold it to the carrier when said carrier moves, a fixed guide $O'$ arranged to hold the diamond on the face of the carrier during the continued movement of said carrier, means for applying paste to the diamond as the carrier moves and means for folding the pasted diamond into a bag-bottom operating during a succeeding rest of the carrier.

9. In a paper-bag machine having an intermittently-rotating carrier, the combination with means for opening the end of a blank into a diamond fold during one position of rest of the carrier and means for applying paste to the diamond during the carrier's movement, of reciprocating and oscillating blades $J^6 J^6$ arranged to clamp the diamond fold against the carrier-table and define the lines of the final folds, folding-fingers $I^3 I^3$ mounted on a reciprocating slide I and operating to fold the flaps of the diamond over the ends of the blades $J^6$, means for retracting the fingers and blades as described and means for releasing the finished bags from the carrier.

10. In a paper-bag machine the combination with an intermittently-revolving carrier having recesses $D'$ formed in its face with straight edges $D^2$, of tables $D^3$ elastically supported in said recesses and adapted under pressure to recede below the edges $D^2$, means for folding a bag-blank end into a diamond upon said tables, reciprocating and oscillating blades $J^6$ acting during a rest of the carrier to press against the center of a diamond fold on one of the tables and to press in the elastically-supported table so that the ends of the diamond are thrown up between the ends of said blades and the straight edges $D^2$, folding-fingers $I^3 I^3$ acting to fold the flaps of the diamond down upon the bag-bottom and means for retracting said blades and fingers as described.

11. In a paper-bag machine having an intermittently-rotating carrier and means, as described, for folding the end of a blank into a bag-bottom during successive rests of the carrier, the combination of a pair of rolls arranged to receive and withdraw finished bags from the carrier and a reciprocating blade $F^{13}$ arranged to engage the bags on the carrier and deliver them to the said rolls.

GEORGE R. WARD.

Witnesses:
GEORGE A. LESSEY,
GEO. A. PATTERSON.